Patented Oct. 13, 1953

2,655,514

UNITED STATES PATENT OFFICE 2,655,514

PESTICIDAL COMPOUNDS

Morton Kleiman, Chicago, Ill., assignor to Arvey Corporation, a corporation of Illinois No Drawing. Application July 5, 1952,
Serial No. 297,398

4 Claims. (Cl. 260—346.2)

This invention relates to a new group of compositions of matter. More specifically, this invention relates to a group of compounds characterized in part by their having a partially hydrogenated naphthalene structure with the 1,4 and 5,8 carbon atoms thereof being bridged respectively by an endomethano group and an oxygen bridge and containing an additional epoxide cycle. These compounds are further characterized in that they are hexahalogenated in fixed and known positions. The compounds of the present invention are, therefore, hexahalo-1,4-methano-5,8-oxa-6,7-epoxyoctahydronaphthalenes. The present compounds thus each contain two oxygen atoms which are each a component of a cycle.

The chemical nomenclature used herein to name the compounds of the present invention conforms with the rules and examples set forth in "The Ring Index" by Patterson and Capell, A. C. S. Monograph Series, No. 84, 1940.

The compounds of the present invention are unexpectedly active pesticidally, and are very valuable insecticides from the standpoints both of immediate and residual control of insect pests.

Broadly, the products of the present invention are prepared by epoxidizing the Diels-Alder adduct of a furan with 1,2,3,4,7,7-hexachlorobicyclo-[2.2.1]-2,5-heptadiene. The Diels-Alder reaction to prepare said adduct is one wherein the furan component acts as the diene. In the present case, "a furan" is meant to include those compounds having the basic conjugated dienic, heterocyclic structure such as furan, 2-methyl furan and 2,5-dimethyl furan.

1,2,3,4,7,7-hexachlorobicyclo-[2.2.1]-2,5-heptadiene may be prepared by reacting hexachlorocyclopentadiene with vinyl chloride to form the Diels-Alder adduct of these components and then dehydrohalogenating said adduct. Example I illustrates a specific method for preparing this bicyclic diene.

Example I (a) Hexachlorocyclopentadiene (2,205 g.; 8.1 mole) was placed into a 2-liter, 3-necked flask equipped with a stirrer, thermometer and reflux condenser containing a gas inlet tube equipped with a sparger extending below the surface of the hexachlorocyclopentadiene. While maintaining the hexachlorocyclopentadiene at 200° C., vinyl chloride was bubbled through it continuously for a period of 14 hours. During this period 482 g. (7.7 mole) of vinyl chloride reacted with the hexachlorocyclopentadiene. The product of this reaction, 1,2,3,4,5,7,7 - heptachlorobicyclo-[2.2.1]-2-heptene, was purified by vacuum fractional distillation. The product distilled at 147–148° C. (stillhead temperature) at a pressure (absolute) of 12 mm. of mercury.

(b) 1,2,3,4,5,7,7 - heptachlorobicyclo-[2.2.1]-2-heptene (33.5 g.) was added to a refluxing solution of KOH (8 grams) in absolute ethanol (100 ml.). Heating was continued to maintain the mixture at reflux temperature for three additional hours. After this time the ethanol was removed by evaporation in vacuo and the residue taken up in hexane. The hexane solution was filtered to remove KCl and unreacted KOH. The hexane was removed from the filtrate by distillation and the residue, containing the desired bicycloheptadiene product was purified by vacuum fractional distillation with said product being recovered at a temperature of 128–130° C. under 7.0 mm. mercury pressure (absolute).

Example II illustrates the preparation of 1,2,3,-4,10,10 - hexachloro-1,4-methano-5,8-oxa-1,4,4a,-5,8,8a-hexahydronaphthalene which is an intermediate of a product of the present invention.

Example II 1,2,3,4,7,7-hexachlorobicyclo-[2.2.1]-2,5-heptadiene (0.2 mole; 59.8 g.) was heated to 165° C. in a 200 ml., 3-necked flask equipped with a stirrer, reflux condenser, dropping funnel and thermometer. Furan (25 ml.) was slowly added beneath the surface of the heated heptadiene over a four-hour period. On standing overnight the product crystallized out of the cooled reaction mixture. The mixture was filtered and the crystals were washed with pentane and then were twice recrystallized from methanol. The thus purified product melted at 138.7–139.6° C. The following elementary analysis was obtained:

|  | C | H | Cl |
|---|---|---|---|
|  | Percent | Percent | Percent |
| Analysis of product | 36.26 | 1.92 | 57.85 |
| Calculated for $C_{11}H_6Cl_6O$ | 36.01 | 1.65 | 57.98 |

The product is the 1:1 Diels-Alder adduct of 1,2,3,4,7,7-hexachlorobicyclo-[2.2.1] - 2,5 - heptadiene with furan, said furan reacting as the diene component.

Other furans, for example, 2-methyl furan or 2,5-dimethyl furan, may be substituted for the specific furan utilized in Example II to prepare the intermediates of the present invention. The reaction in any case involves an equimolar adduction of the reactants utilized, namely, hexachlorobicycloheptadiene and a furan. While hexachlorobicycloheptadiene has two double bonds, only the unsubstituted one (i. e. the carbon atoms of which have hydrogen attached thereto) is reactive in the present case and therefore no special precautions need be taken to avoid reaction at the substituted double bond.

In view of the foregoing, these intermediates may be prepared by reacting an equimolar ratio of reactants, or an excess of the furan (dienic component) is preferred. Lesser proportions of the furan component may be utilized but such would result in an incomplete utilization of the bicyclic component and is therefore uneconomical.

The reaction temperature is not critical in that it may vary over a range of temperatures. Thus a furan can be adducted with hexachlorobicycloheptadiene at temperatures between about 100° C. to about 200° C. Excessively high temperatures may cause some decomposition and are therefore undesirable. The use of lower temperatures merely reduces the rate of reaction. Temperatures between about 125° C. and about 185° C. are eminently suited insofar as rate of reaction and quality of product are concerned.

As is the case with most chemical reactions, the rate thereof is proportional to the temperature. The reaction time may vary between about ½ to about 10 or more hours, depending on the temperature employed. When employing temperatures in the lower portion of the range, the time required to complete the reaction may be about 10 or more hours. The use of more elevated temperatures substantially reduces the length of time. Excess time is not harmful since after reaction has taken place the product is reasonably stable. Less time than is required to complete the reaction only results in having some unreacted components in the reaction mixture, but does not affect the obtaining of the desired product.

The reaction to prepare the intermediates of the present invention is preferably carried out in the absence of solvent; however, where temperature control is desired, the use of a solvent boiling at approximately the temperature of reaction may be used and may be preferred. Useful solvents are many; it being only desired that such solvent be not reactive under the conditions utilized and that its solvency characteristics are such as to at least partially dissolve the reacting components. Hydrocarbon solvents, both aliphatic and aromatic, chlorinated solvents, alcohols, ethers, esters and the like, are suitable. Specifically, benzene, toluene, xylene, hexane, heptane, carbon tetrachloride, chloroform, ethanol, diethyl ether, etc., are useful solvents.

Pressure techniques may also be utilized to prepare the intermediates of the present invention. Thus, the reactants can be placed in a pressure vessel and reacted under the pressure generated by the vapor of the reactants and solvent (if the latter be utilized). Since the reaction involves the formation of one mole of material per 2 moles reactant, the application of pressure is desirable.

Exemplifying the use of a pressure vessel in the preparation of intermediates for the present process, Example III shows how 1,2,3,4,10,10-hexachloro - 1,4 - methano - 5 - methyl - 5,8-oxa-1,4,4a,5,8,8a-hexahydronaphthalene may be prepared from 2-methyl furan and 1,2,3,4,7,7-hexachlorobicyclo-[2.2.1]-2,5-heptadiene.

Example III 1,2,3,4,7,7 - hexachloro - bicyclo - [2.2.1] - 2,5-heptadiene is placed in a pressure vessel and heated to 155° C. An equal molar quantity of 2-methylfuran is pumped into the vessel over a one-hour period and the reaction mixture maintained at about 155° C. for about 4 additional hours. After this period, the reaction vessel is allowed to cool and the desired product is isolated and purified by repeated crystallization from methanol.

Similarly, reaction with 2,5-dimethylfuran in place of 2-methylfuran in the process of Example III results in 1,2,3,4,10,10-hexachloro-1,4-methano-5,8-dimethyl - 5,8 - oxa-1,4,4a,5,8,8a-hexahydronaphthalene.

The foregoing hexahydronaphthalenes herein disclosed are described and claimed in my copending application Serial No. 297,397 filed of even date herewith.

The products of the present invention are prepared by epoxidizing the intermediates hereinbefore defined by reaction thereof with an organic per-acid such as perbenzoic acid, peracetic acid, or mono-perphthalic acid. Epoxidation occurs at the non-chlorinated olefinic linkage, the carbon atoms thereof having the numbers 6 and 7 respectively.

It is preferred that any mineral acid, such as free sulfuric acid, which may be present in the organic per-acid be neutralized with an alkaline material such as sodium acetate. The reason for this is that free mineral acid may tend to cause the breaking of the epoxide ring structure, thereby decreasing the yield of desired product.

Normal room temperature or somewhat elevated temperatures, such as up to about 100° C. are very satisfactory for the production of the products of this invention. It is further preferred that a molar excess of organic per-acid be utilized.

Example IV illustrates the preparation of 1,2,3,4,10,10 - hexachloro - 1,4 - methano - 5,8-oxa - 6,7 - epoxy - 1,4,4a,5,6,7,8,8a - octahydronaphthalene from 1,2,3,4,10,10-hexachloro-1,4-methano 5,8 - oxa - 1,4,4a,5,8,8a-hexahydronaphthalene.

Example IV

Into a 250 cc., 3-necked flask equipped with a reflux condenser, separatory funnel, stirrer and thermometer was placed 1,2,3,4,10,10-hexachloro-1,4 - methano - 5,8 - oxa - 1,4,4a,5,8,8a - hexahydronaphthalene (14 grams dissolved in 40 cc. of glacial acetic acid). The contents of the flask were warmed to 75° C. and 11.2 cc. of peracetic acid (45.8%) was added in a dropwise manner through the separatory funnel. After this addition was complete, glacial acetic acid (27 cc.) was added to the reaction mixture and the aforementioned temperature was maintained for an additional 4.5 hours. The extent of reaction was determined periodically by titrating a known aliquot of the reaction mixture iodometrically. When the reaction was substantially complete, the entire contents of the flask were poured into ice water. A crystalline material precipitated and was removed by filtration. It melted at 211–213° C. This product was dissolved in ether (800 ml.), washed with sodium bicarbonate solution, and dried over anhydrous $Na_2SO_4$. The ether was evaporated and the residue was recrystallized from an acetone-hexane mixture. The thus purified product melted at 215 to 217° C. and had the following chemical analysis:

|  | C | H | Cl |
|---|---|---|---|
| Analysis of product | 34.70 | 1.65 | 55.26 |
| Calculated for $C_{11}H_6Cl_6O_2$ | 34.50 | 1.58 | 55.56 |

Similarly, 1,2,3,4,10,10-hexachloro-1,4-methano-5-methyl - 5,8 - oxa - 6,7 - epoxy - 1,4,4a,5,-6,7,8,8a-octahydronaphthalene and 1,2,3,4,10,10-hexachloro - 1,4 - methano - 5,8 - dimethyl - 5,8 - oxa - 6,7 - epoxy - 1,4,4a,5,6,7,8,8a - octahydronaphthalene may be prepared from 1,2,3,4,10,10-hexachloro - 1,4 - methano - 5 - methyl - 5,8 - oxa - 1,4,4a,5,8,8a - hexahydronaphthalene and 1,2,3,4,10,10 - hexachloro - 1,4 - methano - 5,8 - dimethyl - 5,8 - oxa - 1,4,4a,5,8,8a - hexahydronaphthalene respectively, according to the method of Example IV.

The following table illustrates the superior toxicity of 1,2,3,4,10,10-hexachloro-1,4-methano-5,8 - oxa - 6,7 - epoxy - 1,4,4a,5,6,7,8,8a - octahydronaphthalene to adult female German roaches with the toxicant being applied by injection.

| Dosage in microgram of toxicant | Percentage paralyzed after 48 hours |
|---|---|
| 10 | 100 |
| 1 | 100 |
| 0.5 | 100 |
| 0.1 | 40 |

The compounds of the present invention also possess superior insecticidal activity to a wide variety of other insect pests. They may be utilized and applied as a sole active ingredient dispersed in carriers such as dusts, solvents, aqueous dispersions, or other carriers frequently used in the art. In addition, the compounds of the present invention can be used in combination with other insecticides or fungicides.

I claim as my invention:

1. As a new composition of matter, a compound of the group consisting of 1,2,3,4,10,10-hexachloro - 1,4 - methano - 5,8 - oxa - 6,7 - epoxy - 1,4,4a,5,6,7,8,8a-octahydronaphthalene; 1,2,3,4,-10,10 - hexachloro - 1,4 - methano - 5,8 - dimethyl - 5,8 - oxa - 6,7 - epoxy - 1,4,4a,5,6,7,8,8a-octahydronaphthalene; and 1,2,3,4,10,10-hexachloro-1,4 - methano - 5 - methyl - 5,8 - oxa - 6,7 - epoxy-1,4,4a,5,6,7,8,8a-octahydronaphthalene.

2. 1,2,3,4,10,10 - hexachloro - 1,4 - methano - 5,8 - oxa - 6,7 - epoxy - 1,4,4a,5,6,7,8,8a - octahydronaphthalene.

3. 1,2,3,4,10,10 - hexachloro - 1,4 - methano - 5,8 - dimethyl - 5,8 - oxa - 6,7 - epoxy - 1,4,4a,-5,6,7,8,8a-octahydronaphthalene.

4. 1,2,3,4,10,10 - hexachloro - 1,4 - methano - 5 - methyl - 5,8 - oxa - 6,7 - epoxy - 1,4,4a,5,6,7,8,-8a-octahydronaphthalene.

MORTON KLEIMAN.

No references cited.